US011872602B2

(12) United States Patent
Licata et al.

(10) Patent No.: US 11,872,602 B2
(45) Date of Patent: Jan. 16, 2024

(54) FLOW DIVERTER AND BASKET

(71) Applicant: Unified Brands, Inc., Vicksburg, MS (US)

(72) Inventors: Michael P. Licata, Lee's Summit, MO (US); Atul Singhal, Bangalore (IN); Abhishek Agrawal, Chhattisgarh (IN); Richard Seiss, Madison, MS (US); Roger Moore, Brandon, MS (US); Mark Churchill, Grain Valley, MO (US)

(73) Assignee: UNIFIED BRANDS, INC., Vicksburg, MS (US)

( * ) Notice: Subject to any disclaimer, the term of this patent is extended or adjusted under 35 U.S.C. 154(b) by 0 days.

(21) Appl. No.: 17/740,253

(22) Filed: May 9, 2022

(65) Prior Publication Data

US 2022/0266313 A1 Aug. 25, 2022

Related U.S. Application Data

(60) Division of application No. 16/596,459, filed on Oct. 8, 2019, now Pat. No. 11,325,167, which is a (Continued)

(51) Int. Cl.
*A47L 15/42* (2006.01)
*B08B 3/04* (2006.01)
(Continued)

(52) U.S. Cl.
CPC .......... *B08B 3/048* (2013.01); *A47L 15/4214* (2013.01); *B08B 3/06* (2013.01); *B08B 3/10* (2013.01)

(58) Field of Classification Search
None
See application file for complete search history.

(56) References Cited

U.S. PATENT DOCUMENTS 4,854,227 A 8/1989 Koopman
5,303,997 A 4/1994 Kropf
(Continued)

FOREIGN PATENT DOCUMENTS

CN 101316970 A 12/2008
CN 102497800 A 6/2012
(Continued)

OTHER PUBLICATIONS

"Second Office Action received for China Patent Application No. 201910111463.8, dated Feb. 7, 2023."
(Continued)

*Primary Examiner* — Levon J Shahinian
(74) *Attorney, Agent, or Firm* — Kutak Rock LLP

(57) ABSTRACT

A system for and method of improving fluid flow is provided. The system includes a discharge manifold defining a primary flow path partially obstructed by one or more flow diverter. The flow diverter includes an obtrusion pair, each obtrusion of the obtrusion pair extending from a rear wall of the discharge manifold into an interior area of the discharge manifold, thereby creating a void along the primary flow path. The system further includes a first nozzle extending through the primary flow path and into the void such that a nozzle inlet of the first nozzle is positioned at least partially within the void. The system further includes a plurality of subsequent nozzles, each of the first and subsequent nozzles defining a respective secondary flow path for directing fluid away from the discharge manifold. The method includes utilizing obtrusion pairs to reduce or eliminate hydraulic skip.

14 Claims, 14 Drawing Sheets

Related U.S. Application Data continuation-in-part of application No. 29/678,355, filed on Jan. 28, 2019, now Pat. No. Des. 891,105.

(60) Provisional application No. 62/742,778, filed on Oct. 8, 2018.

(51) Int. Cl.
*B08B 3/06* (2006.01)
*B08B 3/10* (2006.01)

(56) References Cited

U.S. PATENT DOCUMENTS

| | | | |
|---|---|---|---|
| D453,027 | S | 1/2002 | Andujar |
| 6,578,720 | B1 | 6/2003 | Wang |
| D477,144 | S | 7/2003 | Remmers |
| D508,167 | S | 8/2005 | Anderson et al. |
| D532,654 | S | 11/2006 | Raichlen et al. |
| D635,363 | S | 4/2011 | Hertaus |
| D686,018 | S | 7/2013 | Etherington et al. |
| D697,310 | S | 1/2014 | Snider |
| 9,596,931 | B1 | 3/2017 | Nimgulkar |
| D799,827 | S | 10/2017 | Greenblatt et al. |
| D814,189 | S | 4/2018 | Nimgulkar et al. |
| D825,268 | S | 8/2018 | Iorio et al. |
| D860,648 | S | 9/2019 | Greenblatt et al. |
| D891,105 | S | 7/2020 | Licata et al. |
| 11,325,167 | B2 | 5/2022 | Licata et al. |
| 2003/0041887 | A1 | 3/2003 | Inch et al. |
| 2007/0235401 | A1 | 10/2007 | Costa et al. |
| 2009/0205682 | A1 | 8/2009 | Tafoya |
| 2009/0255560 | A1 | 10/2009 | Lehmann et al. |
| 2016/0144999 | A1 | 5/2016 | Tang |
| 2017/0135549 | A1 | 5/2017 | Spang et al. |
| 2020/0108421 | A1 | 4/2020 | Licata et al. |

FOREIGN PATENT DOCUMENTS

| | | | |
|---|---|---|---|
| CN | 105307777 | A | 2/2016 |
| CN | 105934187 | A | 9/2016 |
| CN | 111000515 | A | 4/2020 |
| CN | 210631184 | U | 5/2020 |
| EP | 0990413 | A1 | 4/2000 |
| KR | 1020140033895 | A | 3/2014 |
| WO | 2020076848 | A1 | 4/2020 |

OTHER PUBLICATIONS

"Corrected Notice of Allowance received for U.S. Appl. No. 29/678,355, dated Jun. 1, 2020."
"First Office Action received for China Patent Application No. 201910111463.8, dated Aug. 2, 2022."
"International Preliminary Report on Patentability and Written Opinion received for PCT Application No. PCT/US2019/055223, dated Apr. 22, 2021".
"International Search Report and Written Opinion for International Application No. PCT/US2019/055223, Search completed Jan. 23, 2020, dated Jan. 31, 2020, 12 Pgs".
"Non-Final Action received for U.S. Appl. No. 16/596,459, dated Sep. 2, 2021".
"Notice of Allowance received for U.S. Appl. No. 29/678,355, dated Mar. 25, 2020, 7 pages".
"Notice of Allowance received for U.S. Appl. No. 16/596,459, dated Jan. 5, 2022."
"Notice of Decision to Grant Received for Chinese Patent Application No. 201920191717.7, dated Mar. 27, 2020, 2 Pages."
"Office action received in Chinese application 201920191717.7, dated Oct. 18, 2019".
"Restriction Requirement Received for U.S. Appl. No. 16/596, 459 , dated Jun. 16, 2021."
"Decision of Rejection Received for China Patent Application No. 201910111463.8, dated Jun. 16, 2023."

| | 1 | 2 | 3 | 4 | 5 | 6 | 7 | 8 | 9 | 10 | 11 | 12 |
|---|---|---|---|---|---|---|---|---|---|---|---|---|
| Base model | 18.5 | 20.9 | 22.0 | 23.7 | 26.5 | 30.8 | 35.3 | 35.3 | 35.4 | 36.6 | 37.0 | 37.1 |
| Optimized design | 28.6 | 29.5 | 29.2 | 29.9 | 30.0 | 30.2 | 29.3 | 28.5 | 30.8 | 31.6 | 31.7 | 31.7 |

FLOW DIVERTER AND BASKET

CROSS-REFERENCE TO RELATED APPLICATIONS

This application is a divisional of U.S. application Ser. No. 16/596,459, filed Oct. 8, 2019, now U.S. Pat. No. 11,325,167, granted on May 10, 2022, which claims priority to U.S. Provisional Patent Application Ser. No. 62/742,778, filed Oct. 8, 2018, the entire disclosures of which are incorporated herein by reference. U.S. application Ser. No. 16/596,459 also is a continuation-in-part application of co-pending of U.S. Design patent application No. 29/678,355, filed on Jan. 28, 2019, the entire disclosure of which is incorporated herein by reference.

FIELD OF THE INVENTION

The present invention relates generally to a fluid circulating system, such as a continuous motion washing/soaking machine, components of a fluid circulating system, and methods of use of a fluid circulating system, including the washing of wares, food, or other items, thawing of food items, and the like. More specifically, the present invention is concerned with flow diverters for a continuous motion machine (such as a continuous motion washing or thawing machine) and a method of diverting flow for the same. The present invention is also concerned with a means for holding a variety of items within a tank of the fluid circulating system.

BACKGROUND

Continuous motion systems, such as pot and pan (as well as produce and other items) washing machines (as well as food thawing or deglazing machines), of the type used in restaurants, institutions and other eating facilities often involve a large wash/fluid tank or basin in which wash fluid is circulated to provide a rolling wash (or fluid exposure, e.g. for thawing) action for the pots and pans or other items. One such machine is described in U.S. Pat. No. 4,773,436 issued to Cantrell et al., the entire disclosure of which is incorporated herein by reference. The machine of Cantrell includes a wash tank with multiple jets evenly spaced apart at an elevated position along the rear wall of the wash tank. The tank is filled with water (wash fluid) to a level above the position of the jets. Pots and pans are placed in the wash tank, and a pump is activated to draw fluid from within the wash tank and direct it through the jets to create respective jet streams. Each jet directs its jet stream toward the bottom wall of the wash tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provides a rolling washing action within the wash tank.

The basic components of the wash/fluid tank of an exemplary pot and pan washing machine of the prior art are shown in FIG. 1. Wash tank 10 includes end walls 12 and 14, rear side wall 16, front side wall 18 and bottom wall 19. A pump can be attached to either end wall; in the embodiment shown in FIG. 1, pump 50 is attached to right end wall 14. An impeller located within pump 50 is driven by electric motor 56. In the embodiment shown in FIG. 1, the impeller draws fluid into pump inlet 52 through an intake port (not shown) located in end wall 14. The fluid is then discharged from the pump through pump outlet 54 and into outlet manifold 60. Outlet manifold 60 includes a ninety degree turn, and several other turns, to direct the fluid across the back side of rear wall 16 and out jet nozzles 20 which are protruding through and extending from rear wall 16. The intake port associated with pump inlet 52 is covered by perforated (holes, voids, mesh, etc.) intake manifold 30. Intake manifold 30 includes handle 36 and is removably supported within wash tank 10 for easy cleaning. Intake manifold 30 fits tightly between outer runner 32 and inner runner 34, each of which extends vertically from bottom wall 19. Heating element 40 is positioned between intake manifold 30 and end wall 14 for its protection and to maximize the use of space.

Although the prior art pot and pan washing machine disclosed in U.S. Pat. No. 4,773,436 provides an exceptional wash/fluid action, many of the components discussed above hinder the overall efficiency and performance of the machine. The inventions disclosed in U.S. application Ser. Nos. 09/947,484, 09/947,485, and 10/744,666, the entire disclosures of which are incorporated herein by reference, provide components that greatly increase the overall efficiency and performance of the machine, including improvements to the intake and discharge manifolds, jets, pump and system assembly methods. Additionally, the inventions disclosed in U.S. application Ser. No. 12/842,984 (now U.S. Pat. No. 8,685,170), Ser. Nos. 15/334,778, 14/325,148, and 14/738,105, the entire disclosures of which are incorporated herein by reference, provides components and methods for washing produce, deglazing/defrosting items, and cleaning the machine itself. Nevertheless, prior to the advent of the instant invention, even flow through each jet has been difficult to obtain, often creating inconsistent flow within the wash/fluid tank. Thus, it would be beneficial to provide a device for, and method of, diverting flow within a multi jet manifold of a fluid circulating system so as to reduce or eliminate flow inconsistencies.

Although improving flow inconsistencies can increase overall efficiency of a washing, defrosting, deglazing, or similar system, dividers, inserts, baskets, and other items are often useful for separating items during a fluid cycle, for assisting in locating and/or removing items, or the like. For instance, U.S. patent application Ser. Nos. 12/765,838 and 14/379,190 (now U.S. Pat. Nos. 10,028,636 and 9,750,388, respectively), the entire disclosures of which are incorporated herein by reference, teach fluid flow structures and tank dividers which are useful in separating some items and/or for preventing items from impacting and/or becoming pinned against a wall of a tank and/or each other. Unfortunately, such features do not always optimize the volume within the tank. Consequently, it would be beneficial to have a system for optimizing the volume within a tank. It would further be beneficial to have a system for preventing items from impacting and/or becoming pinned against a wall of the tank and/or each other.

Although many of the systems of the prior art provide superior wash, defrost, deglaze, and other fluid flow actions, it is often difficult for users of such systems determine whether an additional item can be placed in a tank and/or whether all items have been removed from the tank. This is particularly difficult to determine when fluid within the tank is murky and/or when the user's view is otherwise obstructed, such as by suds on the surface of the water, by other items within the water, or the like. Consequently, it would be beneficial to have a system for and methods of determining whether an item can be placed within the tank, for assisting a user in determining whether an item is positioned within the tank, and/or for assisting a user remove an item from the tank.

SUMMARY

The present invention comprises a system for and a method of diverting flow within a multi jet manifold of a fluid circulating system (such as a continuous motion fluid washing or thawing machine) so as to reduce or eliminate flow inconsistencies and/or to otherwise enhance evenness of jet flows through a plurality of nozzles, apertures, or the like. The system includes a discharge manifold defining a primary flow path and a plurality of outlets (each being a "nozzle") defining respective secondary flow paths. In some embodiments, each nozzle defines an inlet positioned within the primary flow path and/or adjacent to the primary flow path, such as in a void associated with flow diverters of the present invention. By positioning nozzle inlets within a void positioned adjacent to the primary flow path, hydraulic skip is reduced when compared with nozzle inlets positioned within the primary flow path. In this way, fluid flow into such nozzles (and therefore out of such nozzles) is more consistent.

While each nozzle includes an inlet, not all nozzle inlets are required to be positioned within a void for the invention to provide benefits over the prior art. Instead, because hydraulic skip is generally most severe at the first nozzle along the primary flow path and diminishes for each subsequent nozzle, benefits can be gained by creating voids associated with a first nozzle and/or a first set of nozzles along the primary flow path. In some embodiments, each void is created by positioning a first obtrusion member directly upstream of a respective nozzle and positioning a second obtrusion member directly downstream of such nozzle. Each obtrusion member extends into the interior volume of the discharge manifold from a rear wall/portion of the discharge manifold, thereby creating the void and (at least locally) reducing the width of the primary flow path. The respective nozzle extends through the primary flow path from a front wall/portion of the discharge manifold, thereby creating a secondary flow path that effectively extends through the primary flow path.

The present invention also comprises a rack assembly that is configured to hold a plurality of full and half pans during a fluid flow cycle. A rigid member of the rack assembly defines an interior volume for holding a plurality of other items, thereby maximizing space within the tank. The rack assembly is configured to be removable, thereby increasing versatility of the tank. The rack assembly is configured to increase efficiency and/or productivity prior to a fluid flow cycle, such as by assisting users determine where to position sheet pans (or other items) within the tank. The rack assembly is configured to increase efficiency of a fluid flow cycle, such as by reducing or eliminating movement of items and/or otherwise decreasing adverse effects associated with the same (i.e. impacts, pinning, etc.). The rack assembly is configured to increase efficiency and/or productivity after a fluid flow cycle, such as by assisting users determine whether sheet pans (or other items) are currently positioned within the tank and/or where within the tank such items are positioned.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

Figure 12:
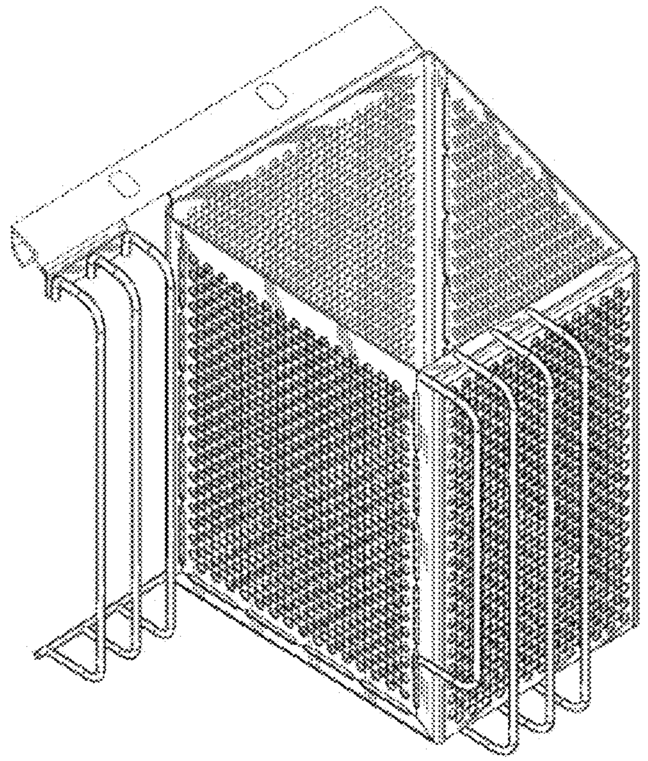

FIG. 12 is a perspective view of an embodiment of a BASKET ASSEMBLY of the present invention, the BASKET ASSEMBLY including a basket, a first set of protruding members extending from a front of the basket, and a second set of protruding members positioned adjacent to a rear portion of the basket, the broken-line showing of a bracket extending from a top portion of the basket and the second set of protruding members forming no part of the invention.

Figure 13:
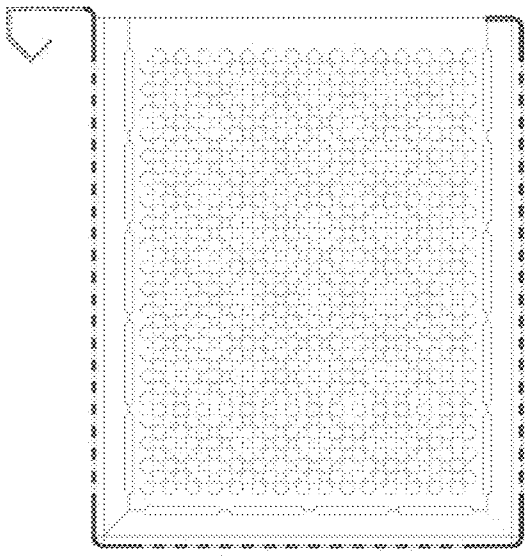
Figure 18:
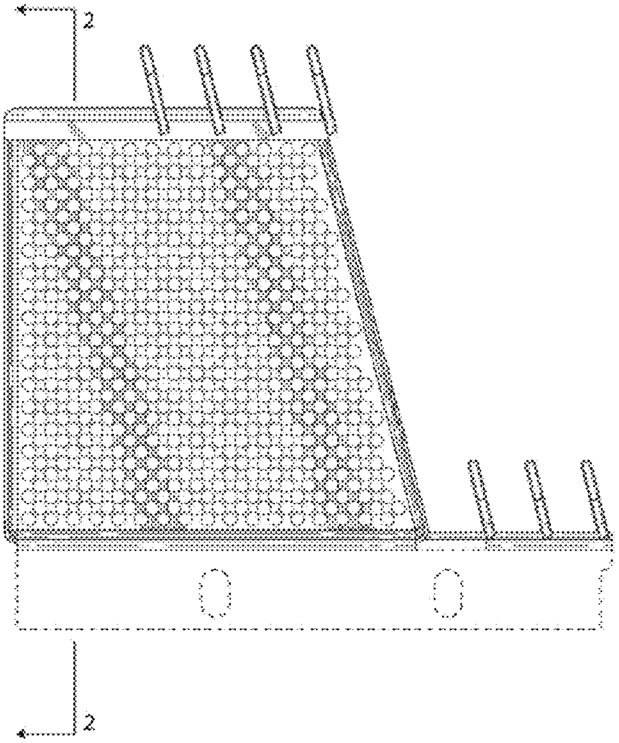

FIG. 13 is a sectional view of the BASKET ASSEMBLY of FIG. 12, the sectional view being taken along line 2-2 of FIG. 18.

Figure 14:
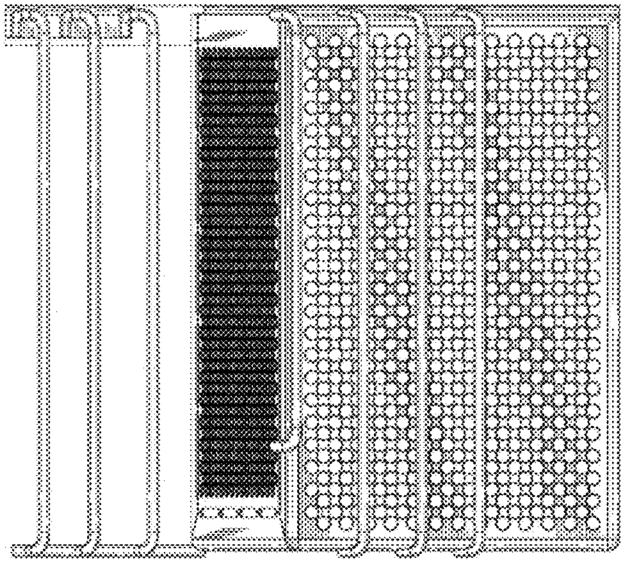

FIG. 14 is a front view of the BASKET ASSEMBLY of FIG. 12.

Figure 15:
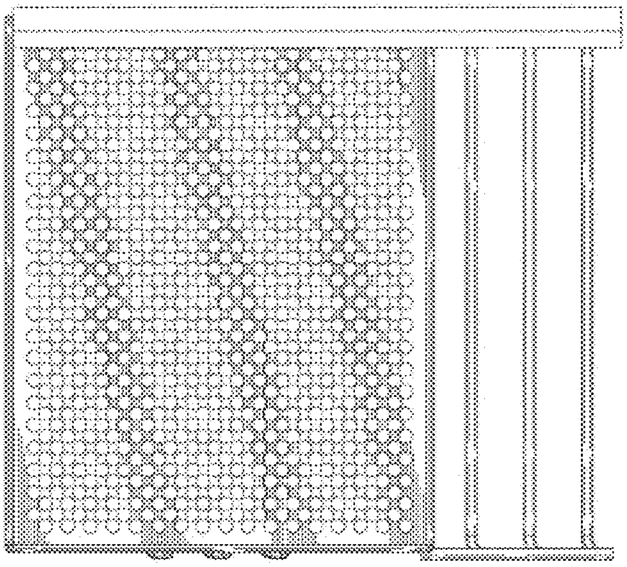

FIG. 15 is a rear view of the BASKET ASSEMBLY of FIG. 12.

Figure 16:
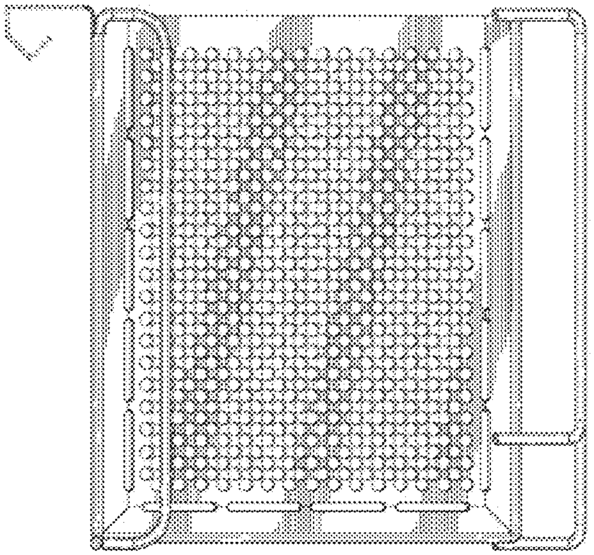

FIG. 16 is a left-side view of the BASKET ASSEMBLY of FIG. 12.

Figure 17:
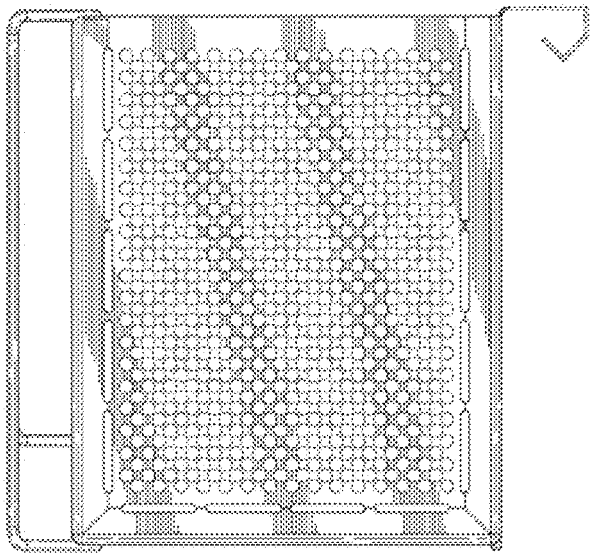

FIG. 17 is a right-side view of the BASKET ASSEMBLY of FIG. 12.

FIG. 18 is a top view of the BASKET ASSEMBLY of FIG. 12.

Figure 19:
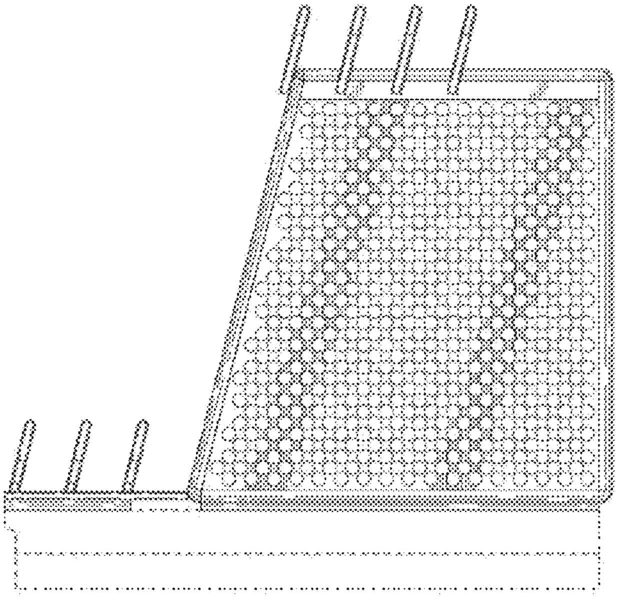

FIG. 19 is a bottom view of the BASKET ASSEMBLY of FIG. 12.

Figure 20:
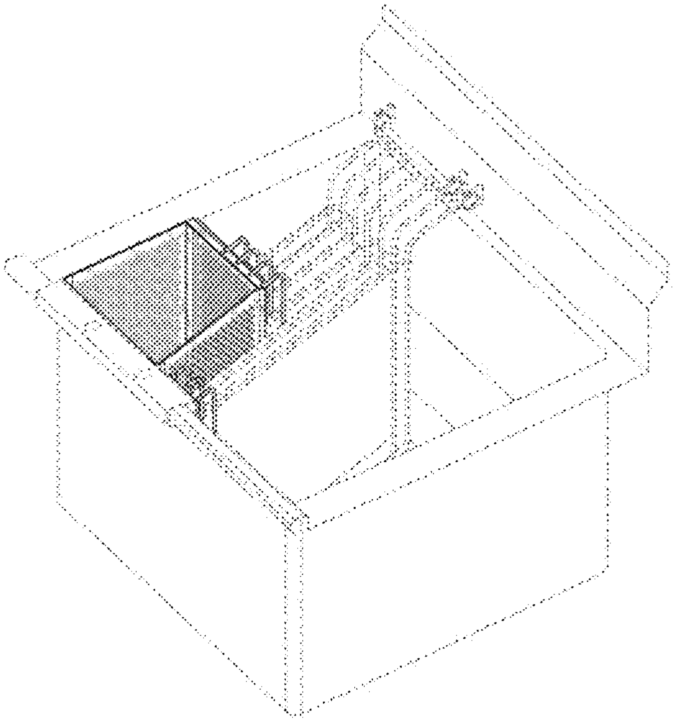

FIG. 20 is a perspective view of the BASKET ASSEMBLY of FIG. 12, shown in a position of use within a WASH TANK as part of a RACK ASSEMBLY supporting a plurality of pans.

Figure 21:
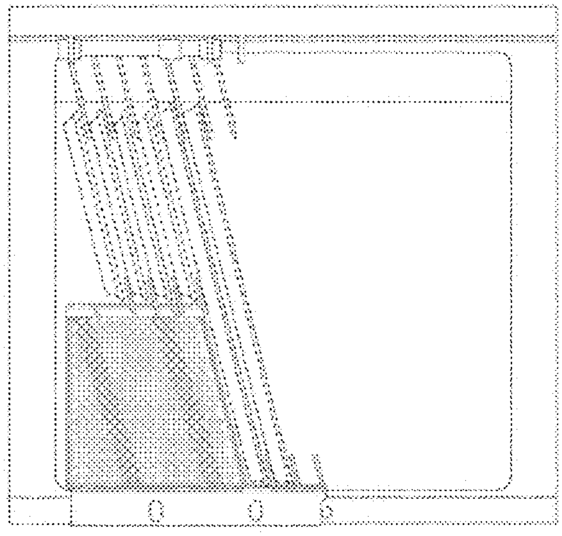

FIG. 21 is a top view of the BASKET ASSEMBLY of FIG. 12, as shown in FIG. 20.

FIGS. 22-26 are associated with calculated flow improvements associated with an embodiment of the present invention as compared with prior art systems.

Figure 22:
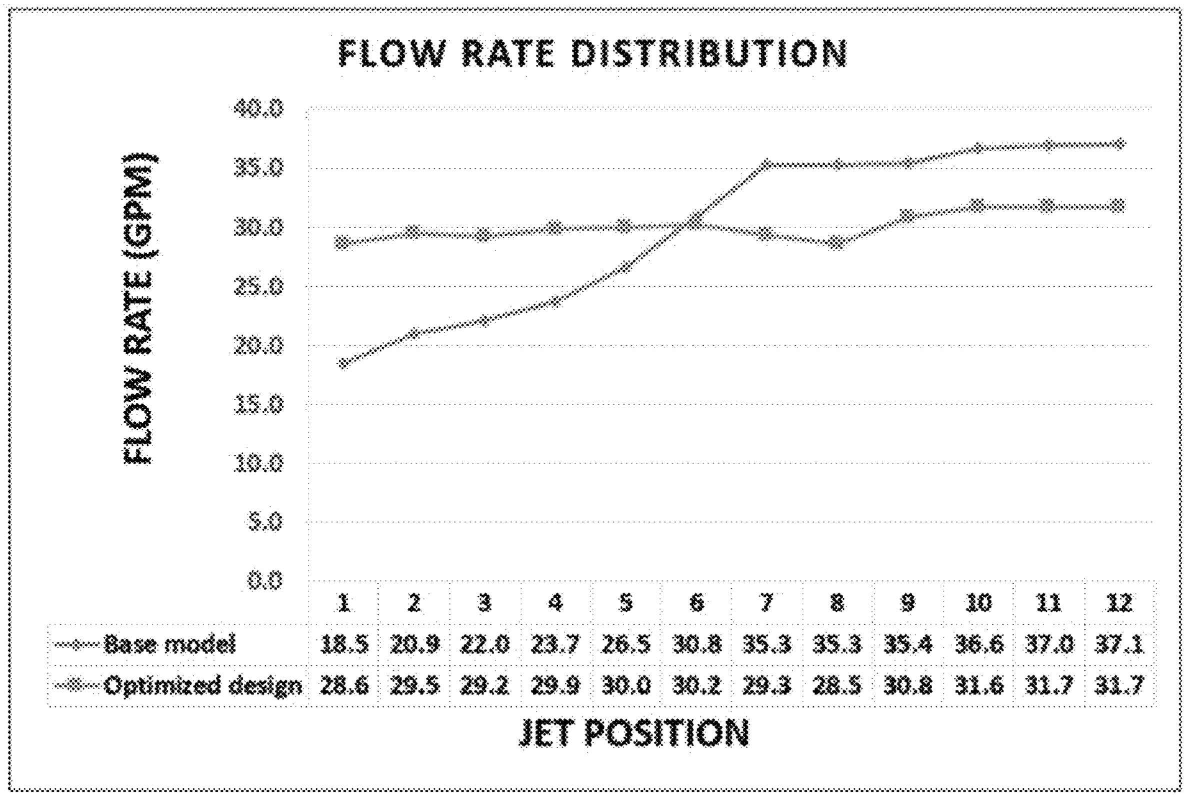

FIG. 22 includes a Flow Rate Distribution chart showing improved flow consistency associated with a 12-jet embodiment of the present invention over a 12-jet system of the prior art.

Figure 23:
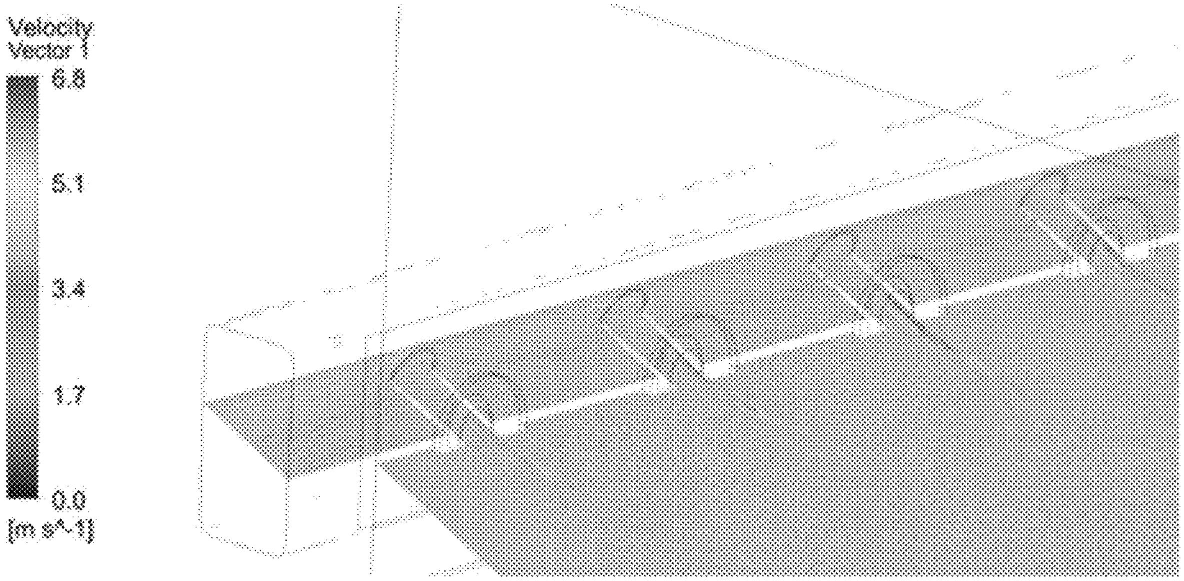

FIG. 23 shows a cut-plane flow vector illustration of the first four jets of the prior art system represented in FIG. 22.

Figure 24:
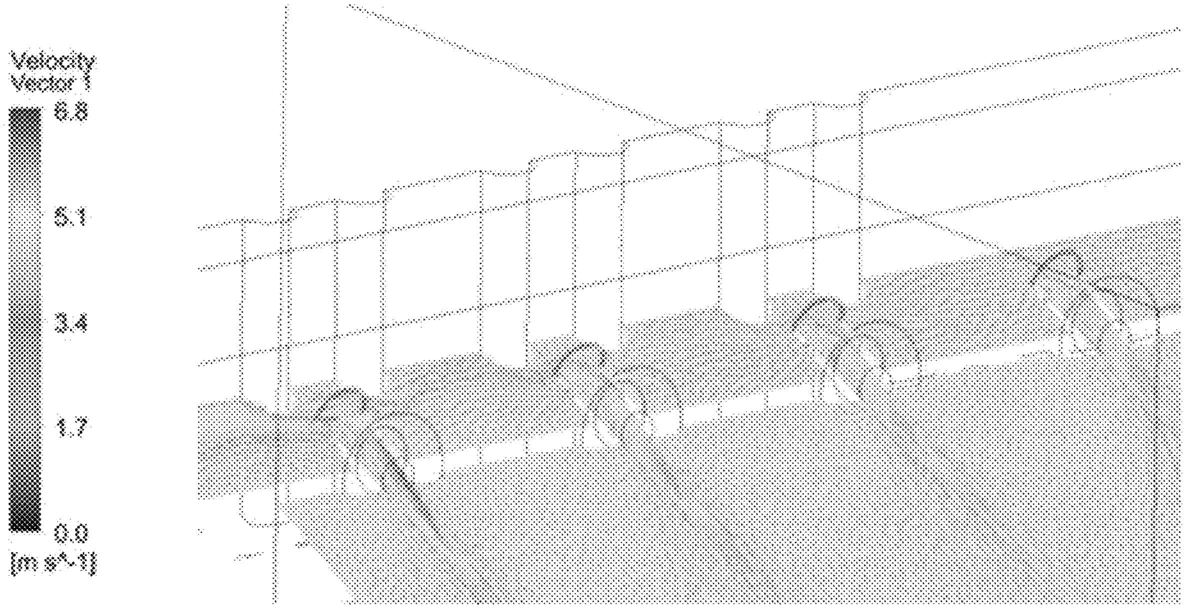

FIG. 24 shows a cut-plane flow vector illustration of the first four jets of the embodiment of the present invention represented in FIG. 22.

Figure 25:
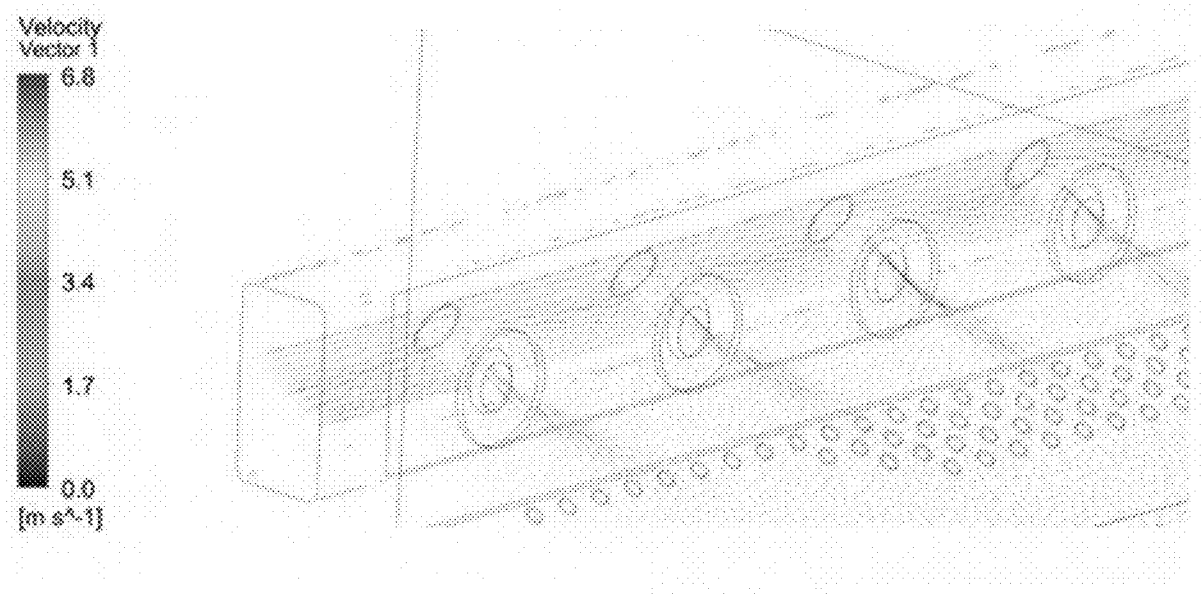

FIG. 25 shows an isometric flow vector illustration of the first four jets of the prior art system represented in FIG. 22.

Figure 26:
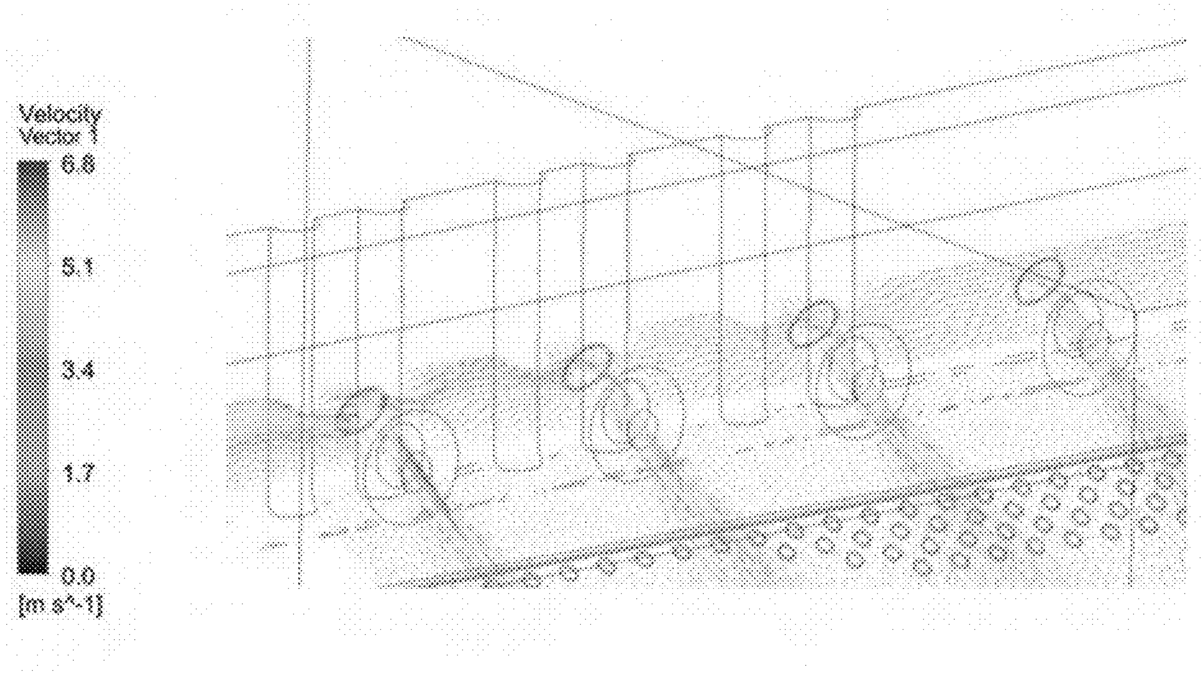

FIG. 26 shows an isometric flow vector illustration of the first four jets of the embodiment of the present invention represented in FIG. 22.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
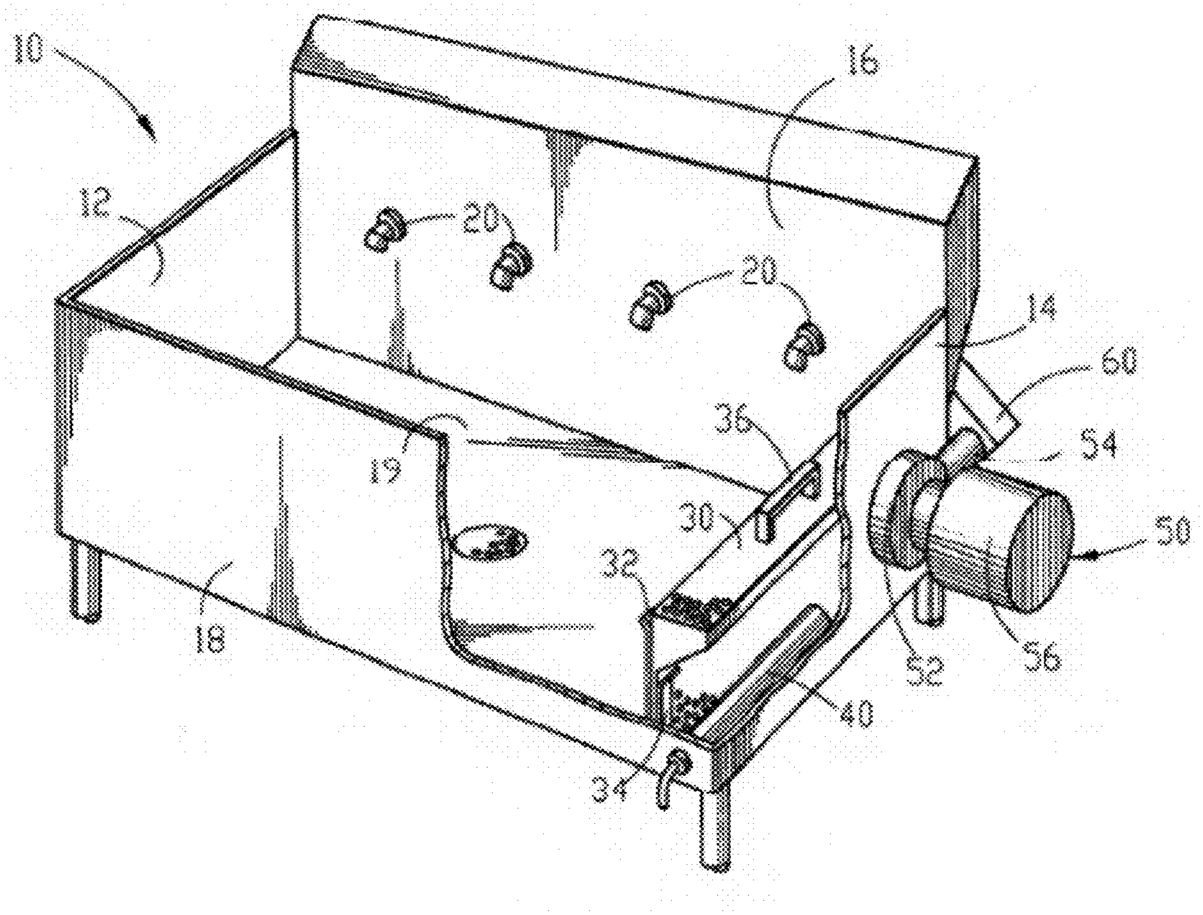
FIG. 1 is a partial perspective view of a continuous motion washing machine of the prior art in which embodiments of the instant invention may be incorporated.
Figure 2:
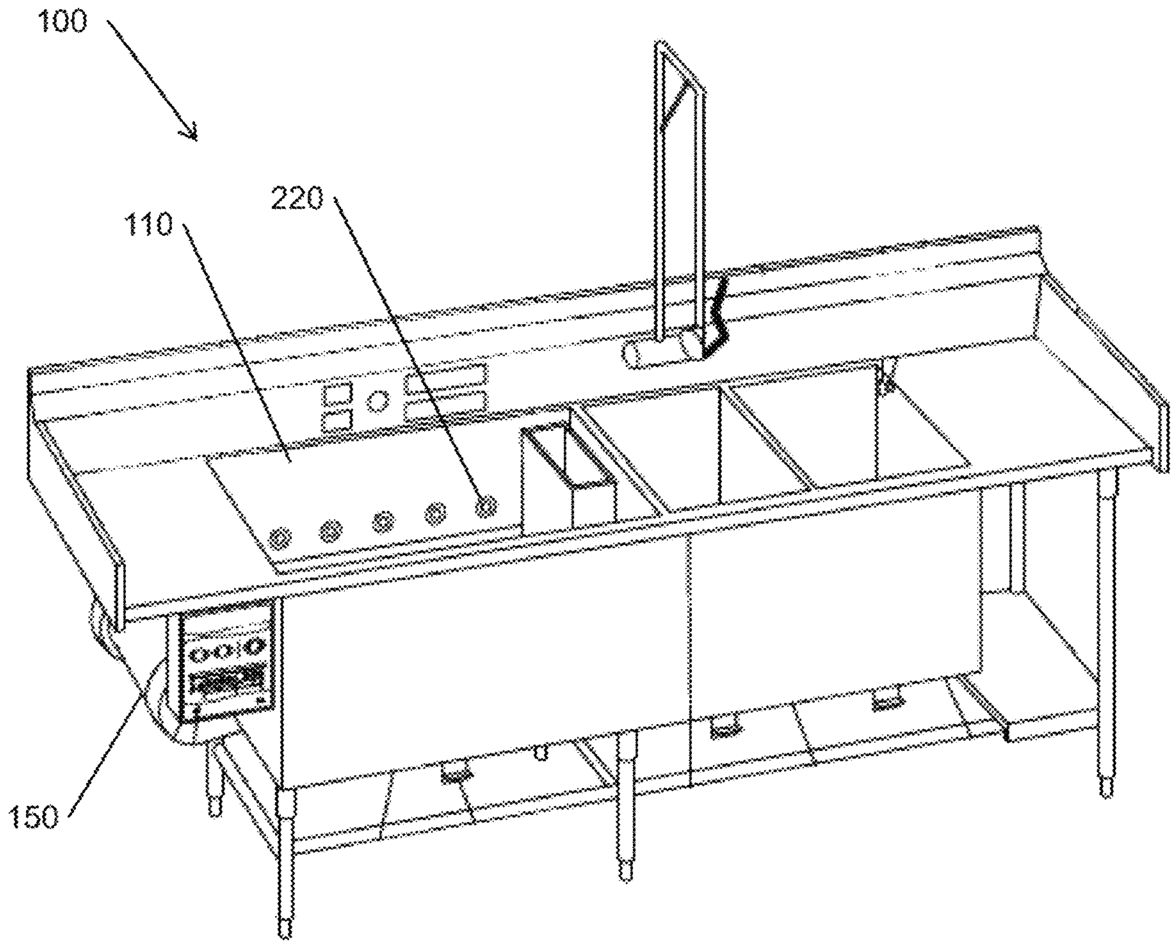
FIG. 2 is a perspective view of a continuous motion machine of the present invention.

Referring to FIG. 2, some machines 100 of the present invention include a tank 110 defining an interior volume 115 for holding a volume of fluid (for washing, thawing, deglazing or other purposes—broadly referred to herein as "washing" or "soaking") and a pump 150 for directing fluid through a plurality of nozzles 220 into the tank, thereby creating a rolling action within the tank 110. In some embodiments, the pump 150 draws fluid from the machine so as to create a continuous fluid washing/soaking action.

Figure 3:
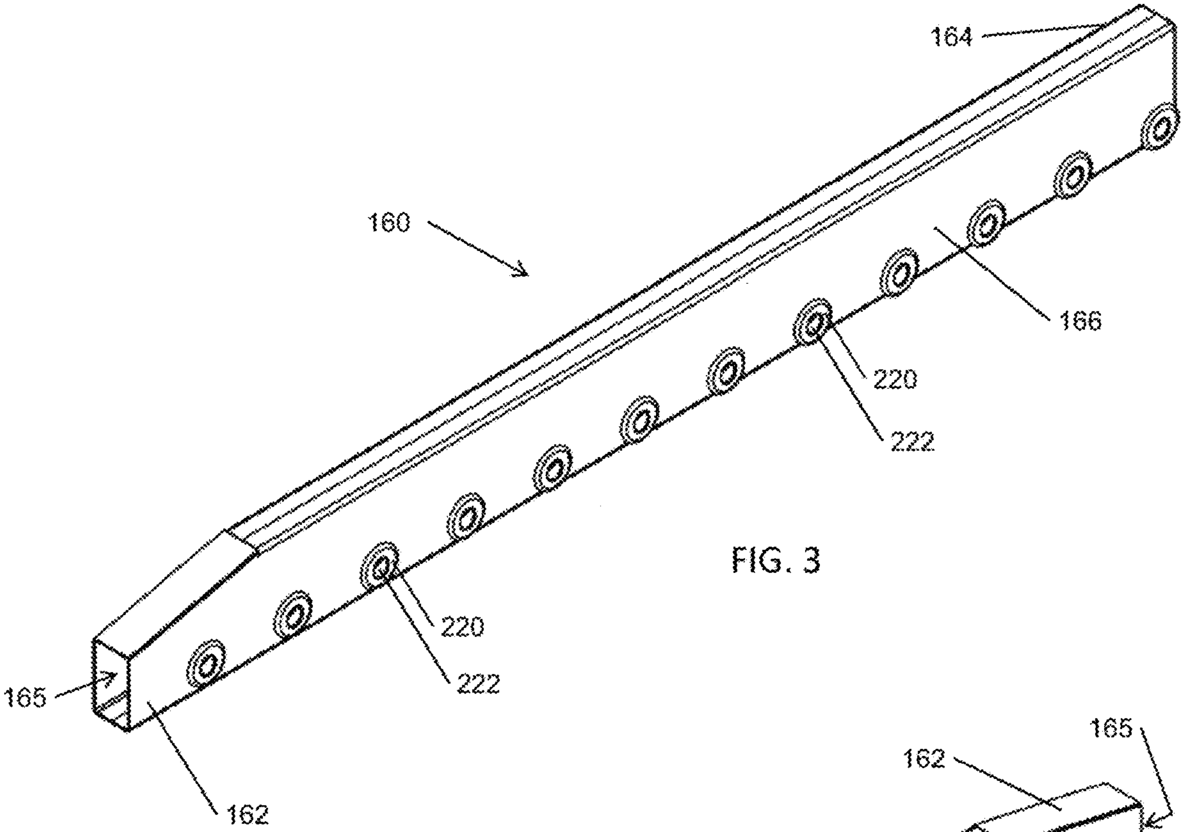
FIG. 3 is a front perspective view of an embodiment of the discharge manifold of the present invention.
Figure 4:
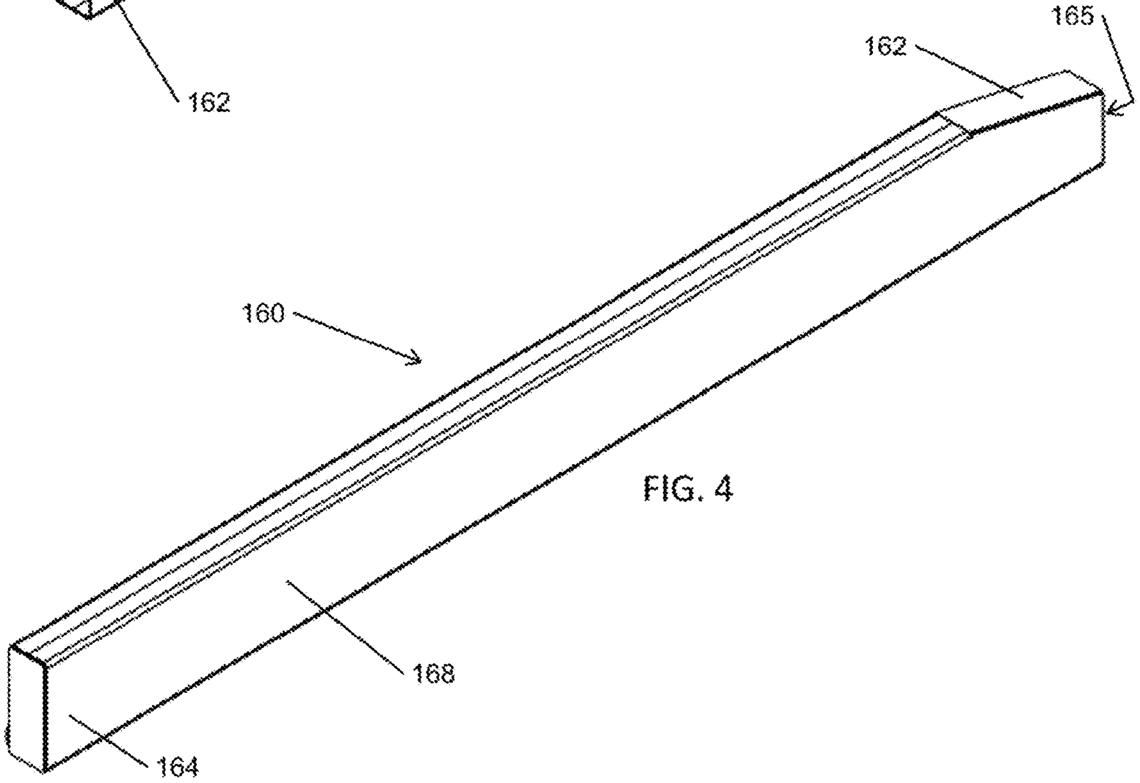
FIG. 4 is a rear perspective view of the discharge manifold of FIG. 3.
Figure 5:
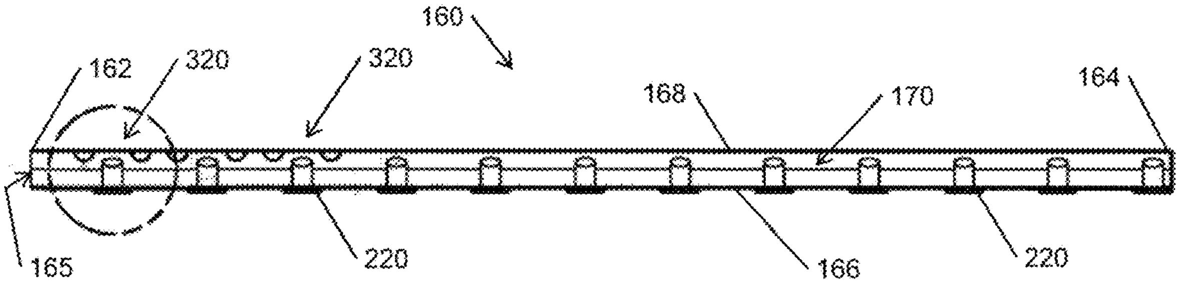
FIG. 5 is a top sectional view of the discharge manifold of FIG. 3.

Referring to FIGS. 3-5, some embodiments of the present invention include a discharge manifold 160 having opposed first 162 and second 164 ends and an outer shell extending therebetween. The outer shell of the discharge manifold 160 defines an interior volume 170 that is configured to facilitate and direct fluid flow through the discharge manifold 160, thereby defining a first pathway and/or primary flow path associated with the discharge manifold 160. In some embodiments, the outer shell comprises opposed front 166 and rear 168 walls associated with respective front and rear portions of the discharge manifold. It will be understood that, in some embodiments, one or more wall and/or portion of the discharge manifold is integrated with and/or formed from one or more portion of the tank 110 and/or one or more other portion of the machine 100.

In some embodiments, the first end 162 of the discharge manifold 160 defines a manifold inlet 165 through which fluid is pumped into the interior volume 170 of the discharge manifold 160. In some embodiments, the front portion of the discharge manifold 160 defines a plurality of discharge apertures and/or is otherwise penetrated so as to facilitate flow of the fluid out of the discharge manifold 160 (each such penetration being a "discharge aperture"). In some embodiments, each discharge aperture is positioned sequentially along the primary flow path. In some embodiments, the primary flow path extends generally from the manifold inlet 165, past each sequential discharge aperture, to the second end 164 of the discharge manifold, thereby facilitating fluid flow to each discharge aperture.

Figure 6:
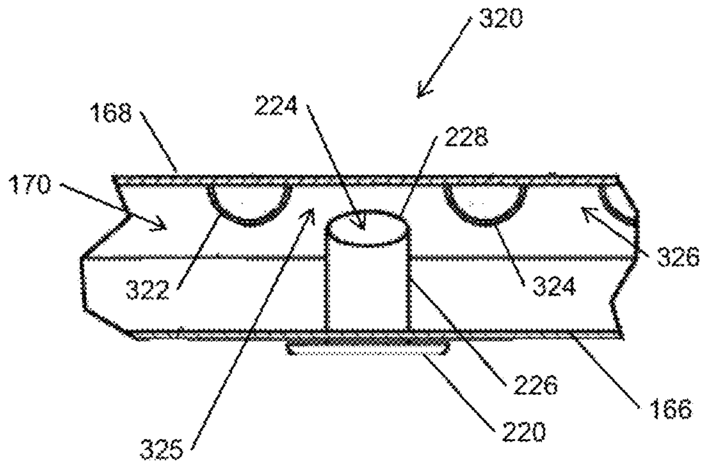
FIG. 6 is an isolated view on an enlarged scale of a portion of FIG. 5.
Figure 7:
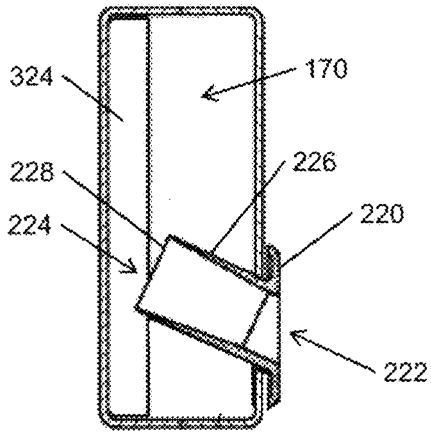
FIG. 7 is a side sectional view of the discharge manifold of FIG. 3.
Figure 8:
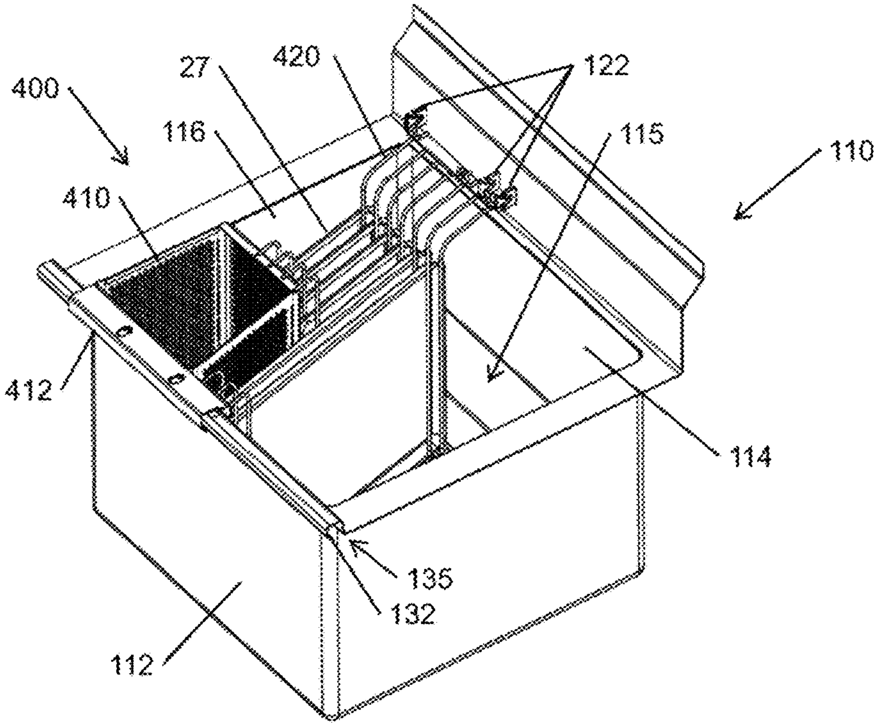
FIG. 8 is a perspective view of an embodiment of a rack assembly of the present invention, the rack assembly shown in positioned within an interior volume of a wash tank with a plurality of full and half sheet pans engaged therewith.
Figure 9:
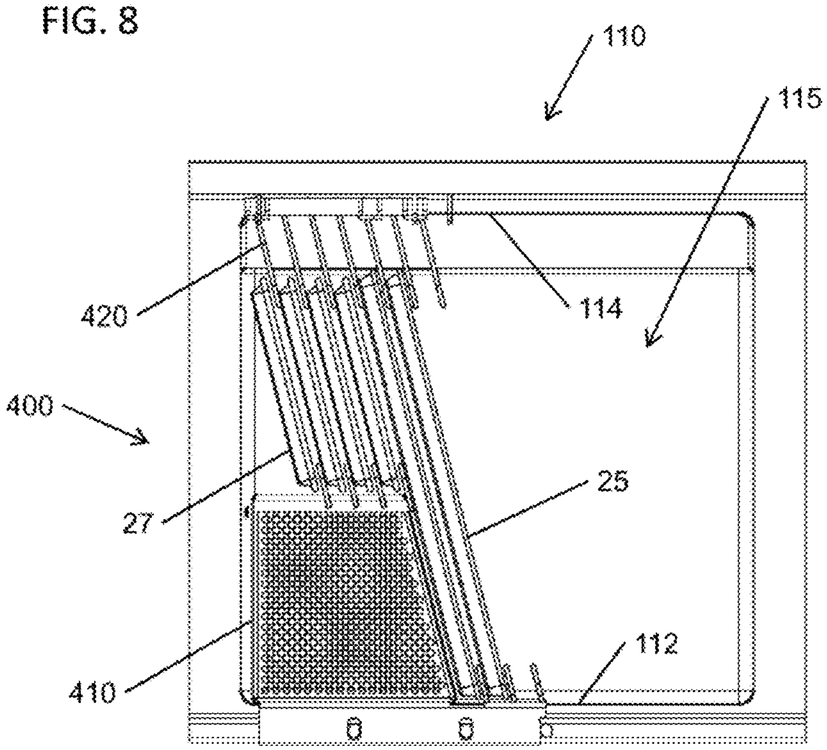
FIG. 9 is a top view of the rack assembly, wash tank, and pans of FIG. 8.
Figure 10:
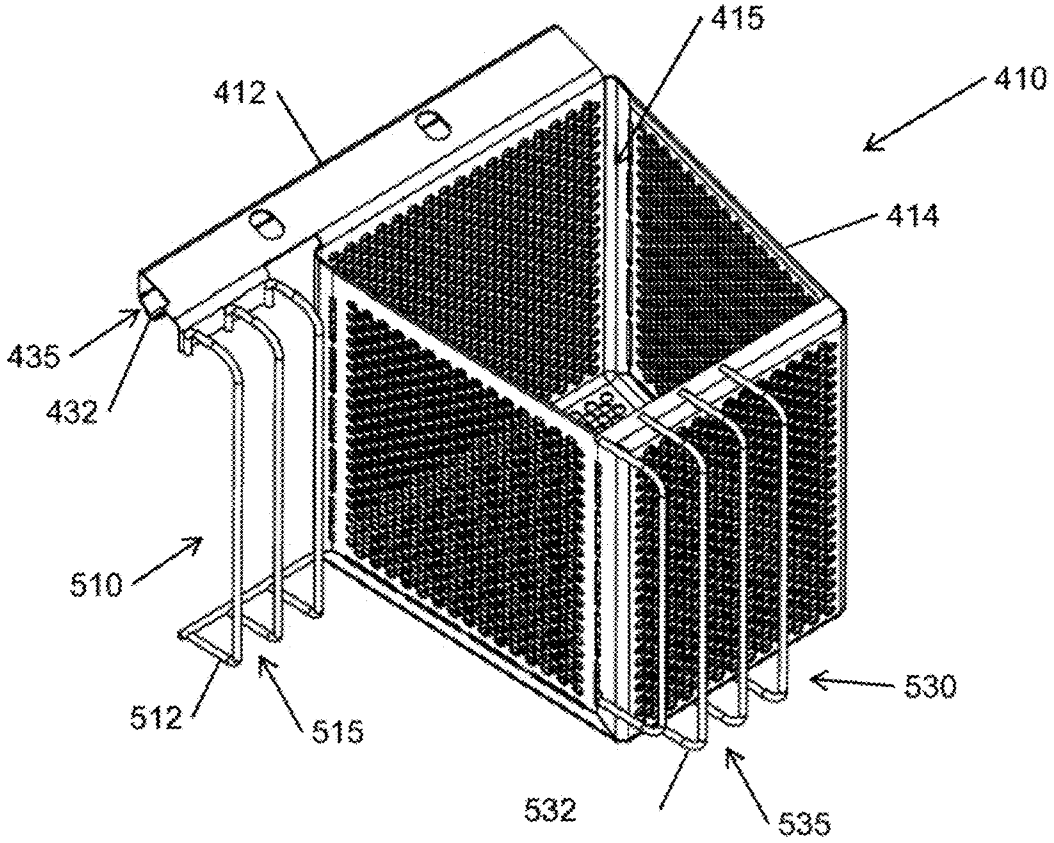
FIG. 10 is a perspective view of a first portion of the rack assembly of FIG. 8.
Figure 11:
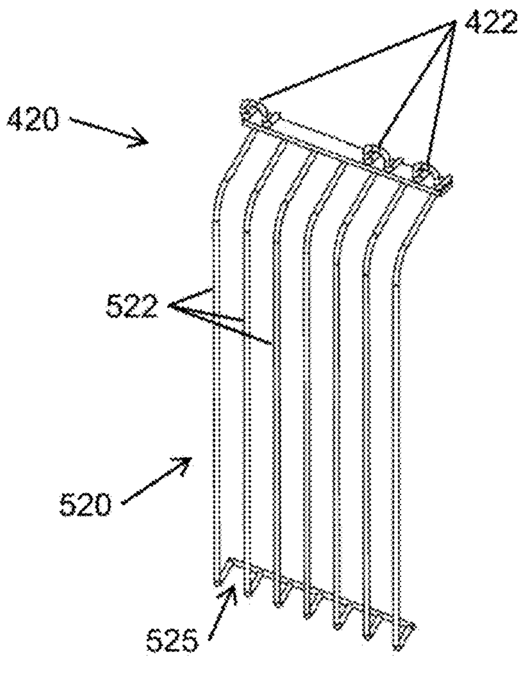
FIG. 11 is a perspective view of a second portion of the rack assembly of FIG. 8.

Referring to FIGS. 5-7, some embodiments of the present invention comprise a plurality of nozzles 220 extending through respective discharge apertures into the interior volume 170 of the discharge manifold. In some embodiments, each nozzle extends an equal distance into the interior volume 170 of the discharge manifold 160 and/or each nozzle 220 is otherwise uniform in size, shape, orientation, and/or the like with each other nozzle. It will be appreciated that in some embodiments one or more nozzle 220 extends a different distance (if at all) into the interior volume 170 of the discharge manifold 160 than one or more other nozzle 220 and/or otherwise includes (or is defined by) an inconsistent size, shape, orientation, and/or the like. It will further be appreciated that in some embodiments one or more discharge aperture of the discharge manifold 160 does not include a nozzle. In some such embodiments, some such discharge apertures are configured to selectively receive one or more nozzle 220 or the like, such as for directing fluid as it flows into a tank 110 or otherwise.

Still referring to FIGS. 6-7, some nozzles of the present invention include a continuous wall 226 having a distal end 228 defining a nozzle inlet 224. In some embodiments, a proximal end of the nozzle 220 is coupled to a front portion of the discharge manifold, such as a front wall 166 of the discharge manifold 160 and/or a wall of the tank 110. In some embodiments, the nozzle 220 defines a second pathway and/or secondary flow path extending from a nozzle inlet 224 through a nozzle outlet 222, thereby facilitating flow of fluid from the interior volume 170 of the discharge manifold 160 into the tank 110.

In some embodiments, one or more secondary flow path extends generally perpendicularly from and/or through the primary flow path. In some embodiments, one or more secondary flow path is oriented so as to optimize creation of a washing/soaking action within the tank 110 of the machine 100. In some such embodiments, at least one nozzle 220 (and usually each nozzle) is oriented in a generally downward angle so as to direct fluid downwardly into the wash/soak tank. In some embodiments, the distal end 228 of one or more nozzle 220 defines an inlet plane associated with the nozzle inlet 224, the inlet plane being generally parallel with the primary flow path. In some embodiments, the secondary flow path is generally perpendicular to the inlet plane. It will be understood that in some embodiments, the inlet plane is angled away from the primary and/or secondary flow paths.

In some embodiments, a secondary flow path associated with a first nozzle extends through at least a portion of the primary flow path such that a primary flow of fluid flowing through the primary flow path towards a second nozzle (such as to feed a secondary flow of fluid associated with the second and/or one or more other subsequent nozzle) must flow around and/or must otherwise flow past a secondary flow of fluid associated with the first nozzle. In some such embodiments, the continuous wall of the first nozzle creates a barrier between the primary and secondary flows of fluid, thereby facilitating extension of the secondary flow path into the interior volume 170 of the discharge manifold 160. In some embodiments, at least one nozzle 220 (and usually each nozzle) extends between 67% and 89% into the interior volume 170 of the discharge manifold 160. In some embodiments, the secondary flow path is perpendicular to (or at least substantially perpendicular to) the primary flow path. In some embodiments, at least one nozzle (and usually each nozzle) defines a taper of not more than generally 15 degrees such that a cross section of a respective nozzle inlet 224 is greater than a cross section of a respective nozzle outlet 222.

In some embodiments, the present invention comprises a first flow diverter 320 associated with a first nozzle 220 of a plurality of nozzles 220, the first nozzle being a first nozzle along the primary flow path. In some embodiments, the present invention comprises a plurality of flow diverters, each flow diverter being associated with a respective nozzle of a plurality of nozzles. In some embodiments, at least one nozzle of the plurality of nozzles is not associated with a flow diverter. In some embodiments, the present invention comprises a first set of nozzles and a second set of nozzles, at least one nozzle of the first set of nozzles being associated with a respective flow diverter and at least one nozzle of the second set of nozzles not being associated with a respective flow diverter. In some embodiments, each nozzle of the first set of nozzles is associated with a respective flow diverter and none of the nozzles of the second set of nozzles is associated with a respective flow diverter.

In some embodiments, each nozzle of the first set of nozzles is positioned upstream of each nozzle of the second set of nozzles. In some embodiments, the first set of nozzles includes a first number of nozzles and the second set of nozzles includes a second number of nozzles, the second number of nozzles being greater than the first number of nozzles. In some embodiments, the second number of nozzles is approximately three times larger than the first number of nozzles.

In some embodiments, each nozzle is either associated with a respective flow diverter (an "associated nozzle") or it is not associated with a respective flow diverter (a "non-associated nozzle"). In some embodiments, each associated nozzle is positioned upstream of each non-associated nozzle. In some embodiments, the present invention includes more non-associated nozzles than associated nozzles. In some embodiments, the present invention includes approximately three times as many non-associated nozzles as associated nozzles.

In some embodiments, each flow diverter comprises an obtrusion pair including first 322 and second 324 obtrusions, the first obtrusion 322 being positioned upstream of a respective nozzle (such as the first nozzle) and the second obtrusion being positioned downstream of the respective nozzle, thereby creating a primary void 325 along the primary flow path. In some embodiments, the distal end of the respective nozzle extends at least partially into the primary void 325, thereby eliminating or otherwise reducing hydraulic skip and/or other fluid phenomena associated with the orientation of the primary flow relative to the inlet plane of the respective nozzle.

In some embodiments, each of the first 322 and second 324 obtrusions of the present invention extends into the interior volume 170 of the discharge manifold 160. In some embodiments, the first 322 and second 324 obtrusions each extend between 44% and 67% into the manifold. In some such embodiments, the discharge manifold 160 is generally rectangular in shape and the obtrusions extend between opposed top and bottom walls of the discharge manifold 160 such that by extending the obtrusions between 44% and 67% into the manifold, a respective local cross section of the interior volume (and the cross section of the fluid flow path) is reduced proportionally. In some embodiments, the discharge manifold 160 defines a rectangular cross section having an aspect ratio of between 1.89:1 and 2.99:1. In some such embodiments, the distance between opposed top and bottom walls of the discharge manifold 160 is greater than the distance between opposed front and back walls of the discharge manifold 160 such that the aspect ratio is a height to width aspect ratio.

In some embodiments, the first 322 and second 324 obtrusions each define an outer periphery that is substantially consistent as such obtrusions extend between top and bottom walls (and/or top and bottom portions) of the discharge manifold. In some embodiments, first 322 and second 324 obtrusions of the first flow diverter 320 are equivalent in size and shape and/or are otherwise configured so as to maximize efficiency and/or to improve flow consistency. In some embodiments, at least one obtrusion of the first 322 and second 324 obtrusions defines a rectangular periphery extending into the interior volume 170 of the discharge manifold 160. In some such embodiments, the rectangular periphery includes one or more radiused corner, such as one or more radiused inner and/or outer corner. In some embodiments, at least one obtrusion of the first 322 and second 324 obtrusions defines a triangular periphery extending into the interior volume 170 of the discharge manifold 160. In some such embodiments, the triangular periphery includes one or more radiused corner, such as one or more radiused inner corner and/or a radiused outer corner. In some embodiments, at least one obtrusion of the first 322 and second 324 obtrusions defines at least part of a cylinder, such as at least part of a semi-elliptical and/or semi-circular cylinder. In some such embodiments, the curved periphery includes one or more radiused corner and/or one or more tangent line defined at an intersection of opposing curves.

In some embodiments, the un-obtruded cross section of the interior volume of the discharge manifold is consistent along the entire length (or at least a substantial portion of the entire length) of the first flow path. In other embodiments, the discharge manifold 160 includes a decreasing taper of no more than approximately six degrees along the length of the first flow path such that a cross section of the interior volume 170 near a first nozzle is greater than a cross section of the interior volume 170 near a last nozzle.

In some embodiments, an upstream cross section of the interior volume 170 positioned directly upstream of a first obtrusion 322 is approximately equivalent to a downstream cross section of the interior volume 170 positioned directly downstream of a respective second obtrusion 324. In some embodiments, the upstream and/or the downstream cross section of the interior volume 170 is approximately equivalent to a respective intermediate cross section of the interior volume 170, the intermediate cross section being centered between the first 322 and second 324 obtrusions, thereby defining a center plane of the flow diverter.

In some embodiments, each associated nozzle is positioned between respective first 322 and second 324 obtrusions of respective flow diverters 320. In some embodiments, at least one associated nozzle is centered between respective first 322 and second 324 obtrusions. In some embodiments, one or more associated nozzle is offset from being centered between respective first 322 and second 324 obtrusions. In some embodiments, a position spacing (spacing between an associated nozzle and its respective first obtrusion 322) is between 25% and 75% of respective obtrusion spacing (spacing between respective first 322 and second 324 obtrusions). In some embodiments, the width of the un-obtruded cross section of the interior volume 170 is between 58% and 62% of the obtrusion spacing. In some embodiments, the height of the un-obtruded cross section of the interior volume 170 is between 161% and 172%. In some embodiments, the obtrusion spacing is between 5% and 17% of the overall length of the discharge manifold. In some embodiments, the obtrusion spacing of each flow diverter is such that a respective second obtrusion 324 of such flow diverter is positioned upstream of each subsequent flow diverters, as applicable. In some such embodiments, adjacent flow diverters form a secondary void 326 between adjacent second 324 and first 322 obtrusions of upstream and downstream flow diverters, respectively.

The present invention further includes a method of reducing hydraulic skip associated with fluid flow through a discharge manifold 160, such as for a continuous motion washing/soaking machine 100. In some embodiments, the method includes pumping fluid, such as wash/soak fluid, into the discharge manifold 160 through a manifold inlet 165 so as to generate a primary fluid flow along a primary flow path. In some embodiments, the primary flow path extends form the manifold inlet 165 to each of a plurality of nozzles 220 positioned sequentially along the length of the discharge manifold 160. In some embodiments, each nozzle 220 defines a nozzle outlet 222, a nozzle inlet 224, and a secondary flow path extending therebetween. In some embodiments, the method includes forcing fluid into each nozzle inlet 324, through each respective secondary flow path, and out each respective nozzle inlet. In this way, the fluid can be directed away from the discharge manifold, such as into a tank 110 of the washing/soaking machine 100.

In some embodiments, the method includes diverting at least part of the primary fluid flow away from at least one nozzle inlet, such as a nozzle inlet of a first nozzle. In some embodiments, the method includes positioning first 322 and second 324 obtrusions of a first flow diverter 320 on either side of the first nozzle so as to create a first primary void 325 associated therewith. In some embodiments, the method further includes positioning one or more additional flow diverters 320 relative to one or more additional subsequent (downstream) nozzles. In some embodiments, the method includes extending the first nozzle into an interior volume 170 of the discharge manifold such that at least part of the nozzle inlet 324 of the first nozzle is positioned within the first primary void 325. In some embodiments, the method further includes extending each nozzle associated with a respective flow diverter into the interior volume 170 of the discharge manifold 160 such that at least part of a respective nozzle inlet 324 of each such nozzle 220 is positioned within a respective primary void.

Referring to FIGS. 8-11, some embodiments of the present invention include a rack assembly 400 for positioning one or more item in an interior volume 115 of a tank 110, such as a tank 110 of a continuous fluid motion machine 100. In some embodiments, the rack assembly 400 includes opposed first 410 and second 420 portions that are configured to be secured to opposed first 112 and second 114 walls of the tank 110, respectively, such as opposed front and rear walls of the tank. In some embodiments, the first 410 and second 420 portions of the rack assembly 400 include respective first 510 and second 520 sets of protruding members 512, 522, each protruding member 512, 522 defining a portion of at least one respective proximal 515 and distal 525 slots, each slot 515, 525 being configured to receive respective proximal and distal ends of a standard elongated item 25, such as a sheet pan. In this way, the rack assembly 400 defines a plurality of locating features for locating a plurality of standard elongated items 25 within the interior volume 115 of the tank 110 and/or for preventing or otherwise inhibiting such standard elongated items 25 from: impacting walls of the tank 110; impacting other items within the tank 110, such as a flow guide, a partition, and/or other standard elongated items 25; becoming pinned against a wall of the tank 110; and/or becoming pinned against one or more other item within the tank 110, such as a flow guide and/or another standard elongated item 25.

In some embodiments, the first 510 and second 520 sets of protruding members are offset from each other such that each elongated item 25 is angled relative to the tank 110 and/or relative to a flow of fluid associated with the tank 110, such as a jet of fluid. In this way, the system is configured to optimize fluid flow across a first surface of the standard elongated item 25, such as a cooking surface, preparation surface, baking surface, or the like of such item, so as to maximize effectivity of a washing or other fluid action. In some embodiments, each protruding member 512, 522 is configured to prevent or otherwise inhibit a respective standard elongated item 25 from translating laterally within the tank 110 and/or from rotating within the tank (such as about a vertical and/or longitudinal axis of the tank) while allowing for translation in the vertical direction in and out of the tank. In some embodiments, the first 112 and second 114 side walls are configured to prevent or otherwise inhibit each standard elongated item 25 from translating longitudinally within the tank 110 and/or from rotating within the tank (such as about a lateral axis of the tank) while allowing for translation in the vertical direction in and out of the tank. In some embodiments, a longitudinal axis of the tank 110 extends generally perpendicularly to a longitudinal axis of a respective discharge manifold 160.

In some embodiments, the rack assembly 400 is configured to selectively engage with the tank 110. In some embodiments, the first portion 410 includes a first engagement member 412, such as a single elongate engagement member and/or a plurality of shorter engagement members. In some embodiments, the first engagement member 412 includes a lip 432 defining a raceway 435 for receiving a lip 132 of the tank 110. In some embodiments, a lip 432 of the first engagement member 412 is configured to be received by a raceway 135 defined by a lip 132 of the tank. In some embodiments, the first engagement member 412 is configured to rotatably couple to the tank 110, such as to a top edge of a front wall of the tank 110, so as to enable the first portion 410 to rotate between a deployed configuration within the interior volume 115 of the tank 110 and a retracted configuration displaced from the interior volume 115 of the tank 110. In some embodiments, the first engagement member 412 is configured to slide along the length of (and/or to translate away from) the top edge of the tank while the first portion 410 is in the retracted configuration, thereby allowing the first portion 410 to be selectively engaged with or disengaged from the tank 110, as applicable.

In some embodiments, the second portion 420 includes a plurality of engagement features 422 for selectively engaging with the tank 110. In some embodiments, the engagement features 422 define loops or other features that are configured to receive and/or be received by one or more respective engagement feature 122 of the tank 110.

In some embodiments, the first portion 410 includes a rigid member 414 extending towards the second portion 420. In some embodiments, the first portion 410 includes a third set 530 of protruding members 532, each protruding member 532 of the third set 530 extending from a distal end of the rigid member 414 (and/or being defined by a distal end of the rigid member 414) so as to defining a portion of at least one proximal slot 535 associated with a respective distal slot 525 of the second portion 420. In some embodiments, each slot 535, 525 is configured to receive respective proximal and distal ends of a truncated elongated item 27, such as a half sheet pan. In this way, the rack assembly 400 defines a plurality of locating features for locating a plurality of truncated 27 elongated items within the interior volume 115 of the tank 110 and/or for preventing or otherwise inhibiting such elongated items 27 from: impacting walls of the tank 110; impacting other items within the tank 110, such as a flow guide, a partition, and/or other truncated elongated items 27; becoming pinned against a wall of the tank 110; and/or becoming pinned against one or more other item within the tank 110, such as a flow guide and/or another truncated elongated item 27.

In some embodiments, the third 530 and second 520 sets of protruding members are offset from each other such that each truncated elongated item 27 is angled relative to the tank 110 and/or relative to a flow of fluid associated with the tank 110, such as a jet of fluid. In this way, the system is configured to optimize fluid flow across a first surface of the truncated elongated item 27, such as a cooking surface, preparation surface, baking surface, or the like of such item, so as to maximize effectivity of a washing or other fluid action. In some embodiments, each protruding member 532, 522 is configured to prevent or otherwise inhibit a respective truncated elongated item 27 from translating laterally within the tank 110 and/or from rotating within the tank (such as about a vertical and/or longitudinal axis of the tank) while allowing for translation in the vertical direction in and out of the tank. In some embodiments, the rigid member 414 (such as a distal wall of the rigid member) and the second wall 114 are configured to prevent or otherwise inhibit each truncated elongated item 27 from translating longitudinally within the tank 110 and/or from rotating within the tank (such as about a lateral axis of the tank) while allowing for translation in the vertical direction in and out of the tank. In some embodiments, a longitudinal axis of the tank 110 extends generally perpendicularly to a longitudinal axis of a respective discharge manifold 160.

In some embodiments, first 510 and third 530 sets of protruding members each include a plurality of respective protruding members 512, 532 defining one or more respective proximal slots 515, 535 associated with respective distal slots 525 defined by one or more protruding member 522 of a second set 520 of protruding members 522. In some embodiments, each proximal slot 515, 535 is configured to receive a proximal end of an elongated item, such as a standard 25 and/or truncated 27 elongated item, and each distal slot 525 is configured to receive a distal end of the same. In some embodiments, each proximal slot 515, 535 of the first 510 and third 530 sets of protruding members is offset from a respective distal slot 525 of the second set 520 of protruding members 522 such that each elongated item 25, 27 is angled relative to the tank 110 and/or relative to a flow of fluid associated with the tank 110, such as a jet of fluid. In this way, the system is configured to optimize fluid flow across a first surface of each elongated item 25, 27, such as a cooking surface, preparation surface, baking surface, or the like of such item, so as to maximize effectivity of a washing or other fluid action. In some embodiments, the rack assembly 400 is configured so as to retain each elongated item 25, 27 generally parallel with each of the other elongated items 25, 27, thereby optimizing use of space within the tank 110, maintaining spacing between elongated items 25, 27, and/or otherwise optimizing cleaning, defrosting, deglazing, or other fluid actions.

In some embodiments, the rack assembly 400 is configured to receive a plurality of standard 25 and/or truncated 27 elongated items when the second portion 420 is secured to a second wall 114 of the tank 110 and the first portion 410 is secured to an opposed first wall 112 of the tank and moved to a deployed configuration within the tank 110. In some embodiments, engaging one or more truncated elongated item 27 with the rack assembly 400 prevents or otherwise inhibits the first portion 410 from rotating away from the deployed configuration. In some embodiments, engaging one or more standard 25 and/or truncated 27 elongated item with the rack assembly 400 prevents or otherwise inhibits the first 410 and/or second 420 portion of the rack assembly 400 from moving away from a respective deployed configuration.

In some embodiments, one or more protruding member 512, 522, 532 is configured to extend above a waterline within the tank, thereby providing a user with an indication of where to position one or more elongated item 25, 27 within the fluid and/or an indication of where within the fluid one or more elongated item 25, 27 is positioned. In this way, the rack assembly 400 is configured to assist the user while loading the tank and/or while unloading the tank. In some embodiments, the first 410 and/or second 420 portions of the rack assembly are configured to be moveable from a deployed configuration within the tank 110 to a retracted configuration outside of the tank 110. In some embodiments, engaging one or more standard 25 and/or truncated 27 elongated item with the rack assembly 400 prevents or otherwise inhibits the first 410 and/or second 420 portion from moving away from its deployed configuration, thereby securing the rack assembly 400 in place during a fluid cycle and/or providing an indication that one or more elongated item 25, 27 is positioned within the fluid.

In some embodiments, the rigid member 414 includes opposed proximal and distal walls and a plurality of side walls extending therebetween, thereby defining an interior volume 415 for holding a plurality of items during a wash, defrosting, deglazing, or other fluid cycle. In some embodiments, the rigid member 414 includes a bottom panel and an opposed open top. In some embodiments, one or more wall and/or panel of the rigid member 414 is perforated so as to allow fluid to flow into and out of the interior volume 415 of the rigid member during one or more fluid cycle. In some embodiments, the rigid member 414 is configured to retain items within the interior volume 415 of the rigid member during one or more fluid cycle, thereby preventing such items from impacting and/or becoming pinned against other items within the tank, such as one or more elongated item 25, 27 positioned adjacent to the rigid member 414 or otherwise positioned within the tank 110.

In some embodiments, the third set 530 of protruding members 532 is coupled to and/or is defined by a distal wall of the rigid member 414. In some embodiments, the rack assembly 400 is configured to receive a plurality of truncated elongated items 27 between the distal wall of the rigid member 414 and a second wall 114 of the tank. In some embodiments, the rack assembly 400 is configured to receive a plurality of standard elongated items 25 between opposed first 112 and second 114 walls of the tank 110. In some embodiments, a first side wall of the rigid member 414 is angled so as to be parallel with an adjacent standard elongated item 25, thereby maximizing the interior volume 415 of the rigid member 414. In some embodiments, a second side wall of the rigid member 414 is configured to be substantially parallel with a side wall 116 of the tank 110, thereby allowing the rigid member 414 to be positioned adjacent to the side wall 116. In some embodiments, the first wall 112 of the tank 110 includes one or more engagement feature that is configured to engage with a respective engagement feature of the first portion 410 of the rack assembly 400 so as to prevent or otherwise inhibit the first portion 410 of the rack assembly 400 from moving laterally relative to the tank 110 and/or for assisting in locating the rigid member 414 relative to the side wall 116 of the tank 110.

The present invention further includes a method of maximizing space within a tank. In some embodiments, the method includes securing first 410 and second 420 portions of a rack assembly to respective first 112 and second 114 walls of a tank 110. In some embodiments, the method includes engaging a plurality of standard 25 and/or truncated 27 elongated members with a rack assembly 400, thereby inhibiting movement of the items within an interior volume 115 of the tank 110. In some embodiments, the method includes utilizing a rigid member to partition a portion of the interior volume 115 of the tank 110, the portioned portion being an interior volume 415 of the rigid member 414.

The present invention further includes a method of positioning items within a tank 110. In some embodiments, the method includes securing first 410 and second 420 portions of a rack assembly to respective first 112 and second 114 walls of a tank 110 such that a plurality of protruding members extend above fluid within the tank. In some embodiments, the method includes sliding a plurality of standard 25 and/or truncated 27 elongated items vertically into an interior volume 115 of the tank 110 such that a proximal and distal end of each elongated item is received by a respective proximal and distal slot defined by the plurality of protruding members. In some embodiments, the method includes positioning a plurality of items within an interior volume 415 of a rigid member 414 of the rack assembly 400.

The present invention further includes a method of locating items that are positioned within a tank, thereby assisting with removing such items from the tank, and/or a method of removing items from the tank. In some embodiments, the method includes securing first 410 and second 420 portions of a rack assembly to respective first 112 and second 114 walls of a tank 110 such that a plurality of protruding members extend above fluid within the tank. In some embodiments, the method includes utilizing the protruding elements to identify one or more probable location for one or more standard 25 and/or truncated 27 elongated item. In some embodiments, the method includes attempting to move one or more of the first 410 and/or second 420 portions of the rack assembly 400 away from a deployed configuration so as to determine whether one or more item (such as one or more elongated item engaged with the rack assembly) is located within the tank. In some embodiments, the method includes moving one or more of the first 410 and/or second 420 portions of the rack assembly 400 at least partially away from a deployed configuration so as to remove one or more item from an interior volume 115 of the tank 110 and/or to assist with such removal.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of reducing hydraulic skip in a discharge manifold of a continuous motion fluid style machine comprising a tank for selectively holding a volume of fluid and a pump for creating an action within the volume of fluid, wherein the method comprises:

pumping fluid into the discharge manifold through a manifold inlet, thereby generating a primary fluid flow along a primary flow path, wherein the primary flow path extends from the manifold inlet to each of a plurality of nozzles positioned sequentially along the length of the discharge manifold;

directing the fluid into the tank through a plurality of secondary flow paths, thereby defining a secondary fluid flow along each of the secondary flow paths, wherein each of the plurality of secondary flow paths is defined by a respective nozzle of the plurality of nozzles; and diverting the primary fluid flow away from a nozzle inlet of a first nozzle of the plurality of nozzles;

wherein diverting the primary fluid flow away from the nozzle inlet of the first nozzle of the plurality of nozzles comprises positioning first and second obtrusions of a first flow diverter upstream and downstream of the first nozzle, respectively, so as to define a first void therebetween, and positioning the nozzle inlet of the first nozzle within the first void.

2. The method of claim 1, wherein diverting the primary fluid flow away from the nozzle inlet of the first nozzle of the plurality of nozzles comprises positioning first and second obtrusions of a first flow diverter upstream and downstream of the first nozzle, respectively, so as to define a first void therebetween, and positioning the nozzle inlet of the first nozzle within the first void.

3. The method of claim 1, wherein the first nozzle extends through the primary flow path.

4. The method of claim 3, wherein the first and second obstructions extend between a top wall and a bottom wall of the discharge manifold.

5. The method of claim 4, wherein the first and second obtrusions are positioned on an opposed wall of said first nozzle, respectively.

6. The method of claim 1, wherein each nozzle of the plurality of nozzles is associated with a respective flow diverter.

7. The method of claim 6, wherein the method further comprises extending each nozzle associated with a respective flow diverter into an interior volume, such that at least a part of a respective nozzle inlet of each nozzle is positioned within a respective primary void.

8. The method of claim 1, wherein each respective nozzle of the plurality of nozzles defines a nozzle outlet and a nozzle inlet, said secondary flow path of each nozzle extending between the respective nozzle outlet and nozzle inlet.

9. The method of claim 8, wherein directing the fluid into the tank through a plurality of secondary flow paths further includes forcing fluid into each respective nozzle inlet, then through each respective secondary flow path, and then out each respective nozzle inlet.

10. The method of claim 9, wherein the fluid is directed away from said discharge manifold.

11. A method of reducing hydraulic skip in a discharge manifold of a continuous motion fluid style machine comprising a tank for selectively holding a volume of fluid and a pump for creating an action within the volume of fluid, wherein the method comprises:

pumping fluid into the discharge manifold through a manifold inlet, thereby generating a primary fluid flow along a primary flow path, wherein the primary flow path extends from the manifold inlet to each of a plurality of nozzles positioned sequentially along the length of the discharge manifold;

directing the fluid into the tank through a plurality of secondary flow paths, thereby defining a secondary fluid flow along each of the secondary flow paths, wherein each of the plurality of secondary flow paths is defined by a respective nozzle of the plurality of nozzles; and diverting the primary fluid flow away from a nozzle inlet of a first nozzle of the plurality of nozzles;

wherein each nozzle of the plurality of nozzles is associated with a respective flow diverter.

12. The method of claim 11, wherein the method further comprises extending each nozzle associated with a respective flow diverter into an interior volume, such that at least a part of a respective nozzle inlet of each nozzle is positioned within a respective primary void.

13. A method of reducing hydraulic skip in a discharge manifold of a continuous motion fluid style machine comprising a tank for selectively holding a volume of fluid and a pump for creating an action within the volume of fluid, wherein the method comprises:

pumping fluid into the discharge manifold through a manifold inlet, thereby generating a primary fluid flow along a primary flow path, wherein the primary flow path extends from the manifold inlet to each of a plurality of nozzles positioned sequentially along the length of the discharge manifold;

directing the fluid into the tank through a plurality of secondary flow paths, thereby defining a secondary fluid flow along each of the secondary flow paths, wherein each of the plurality of secondary flow paths is defined by a respective nozzle of the plurality of nozzles; and diverting the primary fluid flow away from a nozzle inlet of a first nozzle of the plurality of nozzles;

wherein each respective nozzle of the plurality of nozzles defines a nozzle outlet and a nozzle inlet, said secondary flow path of each nozzle extending between the respective nozzle outlet and nozzle inlet; and wherein directing the fluid into the tank through a plurality of secondary flow paths further includes forcing fluid into each respective nozzle inlet, then through each respective secondary flow path, and then out each respective nozzle inlet.

14. The method of claim 13, wherein the fluid is directed away from said discharge manifold.

* * * * *